Sept. 27, 1938.  E. L. THEARLE  2,131,602
DYNAMICALLY BALANCING ROTATABLE BODY
Filed June 17, 1936
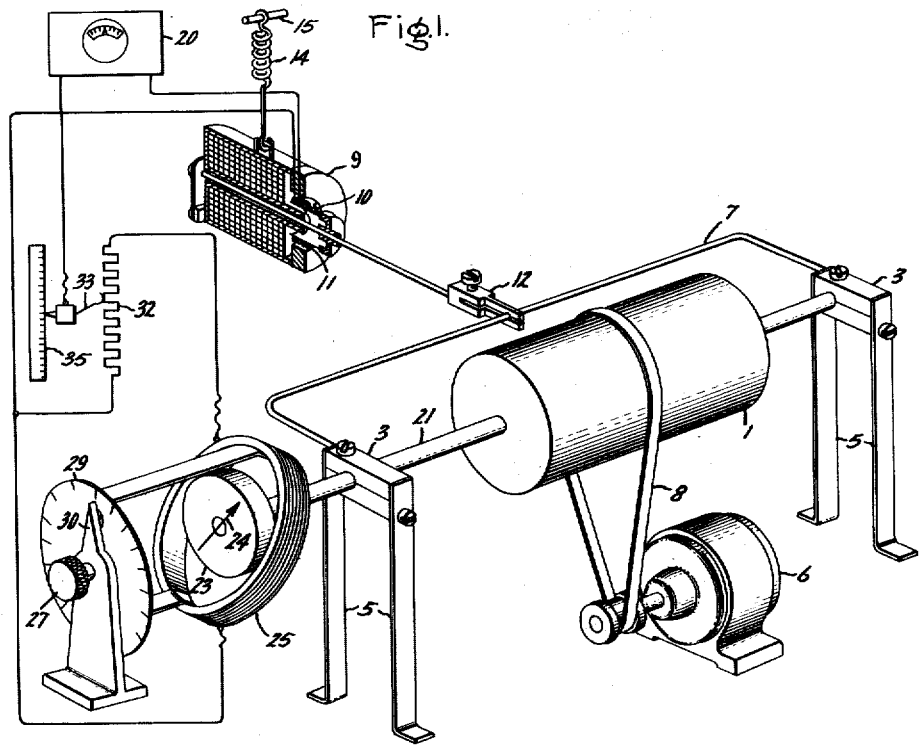
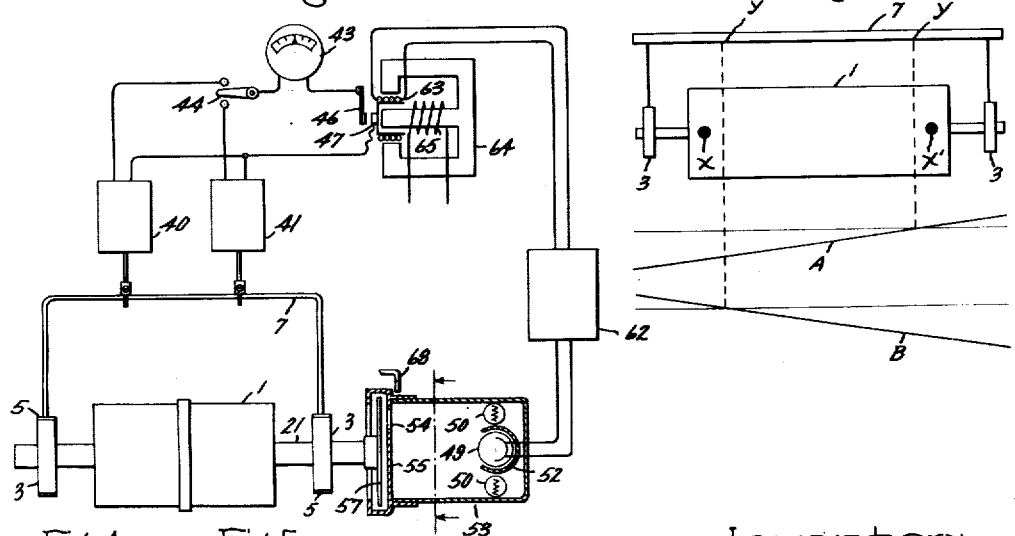
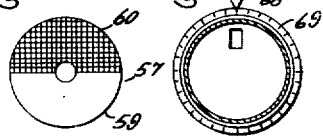
Inventor:
Ernest L. Thearle,
by Harry E. Dunham
His Attorney.

Patented Sept. 27, 1938

2,131,602

UNITED STATES PATENT OFFICE 2,131,602

DYNAMICALLY BALANCING ROTATABLE BODY

Ernest L. Thearle, Schenectady, N. Y., assignor to General Electric Company, a corporation of New York Application June 17, 1936, Serial No. 85,737

10 Claims. (Cl. 73—51)

The present invention relates to an improved means for dynamically balancing rotatable bodies.

The unbalance of a rotating body of substantial length may be regarded as resolved into a pair of separate forces respectively acting in two axially spaced planes passing through the body. Furthermore, correction of the unbalance may be accomplished by the addition, in each such plane, of a corrective weight offsetting the unbalance force acting in that plane. However, in order to determine the amount and radial location of the weights to be added, it is necessary to ascertain the nature of the unbalance forces acting in each plane independently of the effects of forces operating in the other plane.

It is an object of the present invention to provide an improved apparatus for separately determining the amount and location of unbalance forces associated with the respective ends of a rotating body.

A still further object consists in the provision in apparatus of the class described of electrical circuit controlling means operable in variable time phase with the rotations of the body being tested, which means shall be essentially mechanically independent of the body thereby so as to avoid artificially disturbing the vibrations of the same.

The features of novelty which I desire to protect herein are pointed out with particularity in the appended claims. The invention itself, however, with respect to its construction and mode of operation, together with further objects and advantages thereof, will best be understood by reference to the following specification taken in connection with the drawing, in which Fig. 1 illustrates schematically and in perspective an apparatus suitably embodying the invention; Fig. 2 is a schematic diagram useful in explaining the invention; Fig. 3 shows a modified form of application of the invention, and Figs. 4 and 5 are detailed views of particular features of the apparatus illustrated in Fig. 3.

Referring now more particularly to Fig. 1, I have shown a cylindrical rotor 1 typifying a rotating body which is to be tested and balanced. This body is rotatably mounted in bearing blocks 3 supported on vertical struts 5. Rotation is accomplished by means of a motor 6 of determinable speed, acting through a light belt 8 suitably of elastic material. The mounting structure should be light enough so that the first two critical speeds of the system as a whole are below the speed of rotation maintained by the driving motor. It should also be sufficiently flexible to permit substantial vibration of both ends of the rotating body 1 in the horizontal plane. These vibrations are transmitted to a low inertia member or beam 7 which is arranged longitudinally of the rotor shaft and is so connected to the mounting structure as to assure that it will substantially follow the vibratory motion of the rotor. This beam may well be regarded as a part of the mounting structure and is so referred to in at least some of the claims appended hereto.

In cooperative relation with the beam 7 I provide a vibration responsive device comprising an electromagnetic generator consisting of a magnetic core 9 in the air gap of which is mounted a coil of wire 11. This coil is mechanically connected to the beam 7 by means of an adjustable attachment 12 which permits the point of connection to be varied at will. The magnetic core 9 is supported by a spring 14 from the member 15 (shown only in part) in such a way as to permit movement of the whole generator structure axially with respect to the rotor 1. It will be understood that the coil 11 is capable of being moved with respect to the magnet 9 by the vibrations of the beam 7 and the voltage developed in the coil will have characteristics of magnitude and phase determined by the vibrations of the point on the beam 7 to which the attachment 12 is secured. As will be more fully explained in the following, the remaining elements illustrated to the left of Fig. 1 comprises means for analyzing the characteristics of the current flowing in the coil 11.

Before explaining more completely the structural features of my invention, it will be necessary to consider in some detail the nature of the effects produced by unbalance forces existing in an elongated body.

Referring for this purpose to Fig. 2 I have shown diagrammatically a top view of the assembly of Fig. 1. As has been pointed out in the foregoing, the vibrations of a long rotor may be regarded as being due to separate unbalance forces located at the ends of the rotor or in transverse radial planes adjacent the rotor ends. If it be assumed in connection with Fig. 2 that the unbalance of the rotor 1 is ascribable to unbalanced masses located at X and X' respectively, the rotor 1 and, consequently, the beam 7 will be subject to vibrations caused by each of these masses. The vibrations of the beam caused by either mass, say by the mass X, will, in general, not be of uniform amplitude throughout the length of the beam but will vary from point to point and will be zero for some point on the beam which may be considered a null point or center of oscillation. Such a point is indicated, for example, at Y. As referred to this point the line A shows graphically the amplitude of vibration due to the mass X which will be observed at various points along the length of the beam. Similarly the curve B illustrates the nature of vibrations caused by the mass X' with respect to a null point assumed to be at Y'. The balance of the rotor 1 may be restored by supplying in the planes which contain X and X' weights respectively equal to X and X' and 180 degrees displaced therefrom.

It is, however, difficult to determine the amount and location of the separate unbalance forces due to the fact that observations of vibration taken at most axial positions include components due to both the masses X and X'. In accordance with the present invention I successively position the vibration detecting means at points such as Y and Y' which points (hereinafter called "null points") are not responsive to vibrations attributable to forces acting in one of the two selected balancing planes. At each such null point observations are taken indicative of the amount and location of the unbalance forces acting in the other balancing plane. The nature of these observations and of the apparatus by which they are obtained will be set forth more fully in the following:

In applying the method to the balancing of similar rotors, the appropriate null points Y and Y' may be located by preliminary tests conducted on a previously balanced rotor according to the following precedure: The rotor is placed in the mounting bearings 3 and an unbalanced mass applied at one end of the rotor, or in the transverse plane in which it is desired subsequently to add balancing weights. The rotor is then driven at normal speed and the voltage developed in the vibratory coil 11, positioned at an arbitrary point, is observed. Thereafter the attachment 12 is loosened and the electromagnetic generator as a whole is moved along the beam 7 until a zero voltage reading is obtained. Under these conditions, since it is known that all vibrations are due to the single artificially applied unbalanced mass, it will be clear that the null point for masses placed in the same radial plane has been located. In the same way the null point for unbalance forces associated with the other end of the rotor is ascertained by first removing the unbalanced mass and applying it or another mass to the opposite end of the rotor and thereafter determining the point of zero vibration by readjustment of the generator 9. Since the null points thus determined are characteristic of all rotors of similar design and do not vary appreciably from rotor to rotor, the same points may be used for testing other units.

The apparatus above described has many advantages over the conventional cradle type of equipment in the lightness and simplicity of its construction. In the latter as commonly used, a more or less complicated locking means is employed to establish an artificial null point or point of no free vibration. Since this means must unyieldingly support and resist the total force developed by the rotor unbalance, it has to be of rigid and relatively massive construction. In the present device, on the other hand, only very light and readily portable elements are required.

The location of the unbalance forces associated with a given end of the rotor may be determined by impressing the voltage of the coil on a suitable indicating means such as a vacuum tube voltmeter 20, the reading of which is visibly affected by the magnitude of the impressed voltage. The phase of this voltage is determined in such a way as to define the location of the unbalance by gradually varying or modifying the portion of the voltage which is effectively impressed on the meter until a null reading is obtained. Apparatus whereby this result may be accomplished along with a measurement of the amount of unbalance will now be described.

Mounted on the end of the rotor shaft 21 I provide a circular disk which may be magnetized in a single direction, for example, that indicated by the heavy arrow 24. This disk is disposed within a coil 25, the axis of which is angularly displaced with respect to the axis of the shaft 21. With this arrangement each revolution of the magnet 23 produces an alternating voltage in the coil 25 which voltage varies substantially sinusoidally with time. The phase of this voltage with respect to the rotation of a fixed point on the body 1, that is, the instant at which it reaches its maximum value can be varied by rotating the coil 25 by the application of torque to the knurled knob 27. Associated with the coil and rotatable therewith I provide a dial 29 which by reference to the stationary pointer 30 makes it possible to determine the angular position of the coil.

The cyclically varying voltage developed in the coil 25 is impressed on a resistor 32 which by a variable potentiometer connection 33 is connected in circuit with the meter 20. The mode of use of the indicating apparatus comprises the following steps:—With the rotor 1 running at normal speed and the generator 9 connected to one of the null points of the beam 7, the coil 25 is rotated until a minimum reading of the meter is obtained. Under these conditions it will be understood that the voltage generated in the coil 25 is 180 degrees out of phase with that generated in the coil 11 and is, consequently, opposing it. The position of the dial 29 at this time will be indicative of the phase of the voltage generated in the coil 11 and, consequently, of the angular location of the unbalance forces existing at the specified end of the rotor 1. Greater sensitivity may be obtained, however, by adjusting the potentiometer connection 33 until the reading of the meter 20 is reduced from the minimum previously observed to zero. When this condition exists it will be understood that the voltage derived from the coil 25 which is being impressed on the meter 20 is both opposite in phase and equal in value to that generated in the coil 11 by the rotor vibration. By using a precalibrated scale 35 the amount of these equal voltages can be accurately determined as a given percentage of the voltage known to be developed in the coil 25. Thus, not only the location but also the amount of the unbalance force causing the vibrations of the coil 11 will be known.

Thereafter, the generator structure may be moved to the second null point and the unbalance forces acting at the other rotor end determined. As a final step, the rotor is stopped and corrective weights added at the appropriate locations in the selected balancing planes.

Referring to Fig. 3 I have shown another application of the invention embodying an alternative means for analyzing the characteristics of the rotor vibrations. In this figure the voltages derived from a pair of vibration responsive generators 40 and 41 respectively placed at the null points of vibration of the beam 7 are alternatively impressed on a direct current meter 43. The meter circuit is controlled, first, by a manually adjustable switch 44 which determines the generator which is to be connected to the meter and, second, by an intermittently operating contactor comprising the contacts 46 and 47. These contacts are adapted to be closed during a portion of each voltage cycle by a mechanism more fully described in the following which operates in synchronism with the rotations of the shaft 21. Under these conditions the reading of the meter 43 will be indicative of the integrated value or summation of the positive and negative pulses of voltage generated during the period when a complete circuit exists through the meter. It will be understood that for a given amplitude of generated voltage the reading of the meter 43 can be varied from a maximum, which will occur when the circuit is closed either during wholly positive half cycles or during wholly negative half cycles, to a minimum which will occur when the closed period comprises equal pulses of positive and negative voltage. In an article published in Transaction of the A. S. M. E., October 1934, Vol. 56, pages 745 to 753, I have shown that these maximal and minimal readings may be used as indicia of the amount and location of the unbalance forces causing the rotor vibrations. An improved apparatus facilitating such use is described in the following:

The contacts 46 and 47 are controlled in accordance with the present invention by a photoelectric cell 49 adapted to be actuated during a constant fraction of each revolution of the rotor by reflected light initially emanating from a plurality of light sources 50. These are shown as being arranged around the cell 49 and shielded from it by means of an opaque screen 52. The photoelectric cell 49 is enclosed within a container 53 and receives reflected light through an aperture 54 in a disk-like member 55 closing one end of the container. The amount of light reflected and, consequently, the excitation of the photoelectric cell is determined by a rotating disk 57 of relatively slight mass mounted on one end of the rotor shaft 21 and positioned in front of the aperture 54. It will be seen, by inspection of Fig. 5, that the disk 57 comprises a white or highly reflecting semi-circular portion 59 and a dark or poorly reflecting portion 60. The photoelectric cell 49 is connected to an amplifying device 62 of known type whose characteristics are such that it will develop a considerable voltage during the period when the photoelectric cell is excited by light reflected from the disk portion 59 and a much smaller voltage when the disk portion 60 is alined with the aperture 54.

The cyclically varying voltage developed by the amplifier 62 is impressed on a coil 63 movably positioned in the field of a magnet 64 which may be excited by direct current passing through a winding 65. The coil 63 and its mounting structure are of low inertia so that immediate closure of the contacts 46 and 47 results when the light disk portion 59 comes into alinement with the aperture 54 and excites the photoelectric cell 49. It will be seen, therefore, that the contacts are open during 180° and closed during another 180°, the portion of the voltage of the vibration responsive generator which is impressed on the meter 43 being determined by the phase relation of the cyclically varying amplifier voltage to the rotations of a fixed point on the test body. Since the speed of rotation of the disk 57 corresponds to that of the rotor 1 and, consequently, to the frequency of vibrations of the generators 40 and 41 the opening and closing of the contacts is in definite time phase with the alternations of voltage developed by the generators. In order to vary the moments of opening and closing of the contacts and thereby to obtain readings of the meter 43 respectively indicative of the amount and location of the unbalanced forces producing such vibrations, I provide means whereby the angular position of the aperture 54 may be varied at will. This is accomplished by making the disk member 55 rotatable about an axis coincident with that of the disk 57. The position of the aperture required to produce a minimal reading of the meter 43 may be observed by means of a scale comprising a stationary pointer 68 and a dial 69 arranged at the periphery of the disk 55.

In using the apparatus just described the switch 44 is thrown to one of its two positions, say the upper position, to place the generator 40 in series with the meter 43. With the rotor turning at normal speed the disk 55 is rotated until a maximal reading of the meter is obtained. This reading, with proper calibration of the meter 43, will be indicative of the amount of the unbalance force producing the same. Since the effects of forces located at one end of the rotor are eliminated by the position of the generator 40, the observed vibrations will be ascribable entirely to unbalanced forces existing at the other end of the rotor. In order to determine the angular location of the unbalance the disk 55 is again rotated to produce a minimal or null reading of the meter 43 and the position of the scale 69 with reference to the pointer 68 noted. If the disk 57 is similarly oriented with respect to each of the rotors to be tested, the reading of the dial 69, once it is properly calibrated, will be an indicium of the location of the unbalance.

Thereafter the switch 44 is thrown to its alternative position to place the generator 41 in circuit with the meter. The procedure above outlined is then repeated to discover the amount and location of the unbalance force existing at the previously untested end of the rotor.

It is an advantage of both forms of apparatus described in the foregoing that no load is imposed on the rotor shaft which would tend to modify the natural vibrations of the rotor in any way. Both the coil 25 of Fig. 1 and the photoelectric cell of Fig. 3 are separate from the rotating body and are effective to determine its position without imposing any mechanical load whatever. It should be pointed out that the coil 25 may be used in place of the photoelectric cell in the apparatus illustrated in Fig. 3 as a means of developing a cyclically varying control voltage. In this case the output of the coil would be transmitted through the amplifier 62 and used to actuate the member 63 in the manner described.

While I have shown particular embodiments of my invention, it will be understood by those skilled in the art that many modifications may be made without departing from the invention, and I aim by the appended claims to cover all such modifications as fall within the true spirit and scope of the invention.

What I claim as new and desire to secure by Letters Patent of the United States is:

1. In apparatus for analyzing the unbalance of similar rotors, a mounting structure for rotatably supporting one of said rotors to permit substantial vibration of both ends thereof, a vibration responsive device including a generator developing an electrical current whose characteristics are determined by those of the vibrations to which it is subjected, means for connecting said device to a point of said mounting structure which is a null point with respect to vibrations produced by unbalance forces associated with one end of said rotor but is subject to vibrations having characteristics determined by the amount and location of unbalance forces associated with the other end of said rotor, and means for analyzing the characteristics of said current thereby to ascertain the amount and location of the unbalance forces associated with said other end of said rotor.

2. In apparatus for analyzing the unbalance of a rotatable body, a mounting structure rotatably supporting the body, means for revolving the body in said mounting structure, a vibration responsive device operatively connected with the mounting structure for developing a cyclically varying voltage whose characteristics of magnitude and phase are determined solely by unbalance forces associated with one end of said body, an indicating device in circuit with said vibration responsive device, the reading of which is visibly affected by the magnitude of the voltage impressed thereon, and a phase indicator including means connected in circuit with the indicating device for modifying the voltage impressed thereon, said voltage-modifying means comprising a generator for developing a cyclically varying voltage of a frequency corresponding to the speed of rotation of said body, means for varying at will the phase of said cyclical voltage, and a second indicating device, the reading of which is determined by the phase of said cyclical voltage with respect to the rotation of a fixed point on said body.

3. In apparatus for analyzing the unbalance of a rotatable body, a mounting structure for rotatably supporting said body, means for revolving the body in said mounting structure, a member extending longitudinally of said mounting structure and adapted to vibrate in accordance with the vibrations of the body, a vibration responsive device including a generator developing an alternating voltage whose characteristics are determined by those of the vibrations to which it is subjected, means for selectively connecting said generator to various points of said member along the length of the body thereof, an indicating device in circuit with said generator the reading of which is visibly affected by the magnitude of the voltage impressed thereon, means in circuit with said indicating device and said generator for impressing on the indicating device a second alternating voltage of a frequency corresponding to the speed of rotation of said body, means for changing the phase of said second voltage at will, and a second indicating device, the reading of which is determined by the phase of said second voltage with respect to the rotation of a fixed point on said body.

4. In apparatus for analyzing the unbalance of a rotatable body, a mounting structure for rotatably supporting the body, means for revolving the body in said mounting structure, a member arranged longitudinally of said body and adapted to vibrate in accordance with the vibrations thereof, a vibration responsive device including a generator developing an alternating voltage whose characteristics are determined by those of the vibrations to which it is subjected, means for selectively connecting said device to various points of said member along the length of said body, an indicating device in circuit with said generator the reading of which is visibly affected by the magnitude of the voltage impressed thereon, a magnetic element rotatable with said body, a coil cooperatively related to said magnetic element for generating a second alternating voltage, means connecting said coil in circuit with said indicating device and said generator, means for varying the position of said coil with respect to said element to vary the phase of said second alternating voltage, and means indicating the relative position of said coil.

5. In apparatus for analyzing the unbalance of a rotatable body, a mounting structure for rotatably supporting said body and adapted to permit substantial vibration thereof, a vibration responsive device including a generator developing an alternating current whose characteristics are determined by those of the vibrations to which it is subjected, means for connecting said device to said mounting structure, a direct current meter in circuit with said generator, a circuit interrupter in series with said meter and said generator and adapted to be closed during a constant fraction of each revolution of said body, and means for controlling the period of closure of said interrupter, said last-named means being essentially mechanically independent of said rotating body, and including an electrical device developing a cyclically varying voltage of a frequency corresponding to the speed of rotation of said body, means for varying at will the phase of said voltage, and an indicating device, the reading of which is determined by the phase of said voltage with respect to the rotation of a fixed point on said body.

6. In apparatus for analyzing the unbalance of a rotatable body, a mounting structure for rotatably supporting said body and adapted to permit substantial vibration thereof, a vibration responsive device including a generator developing an alternating current whose characteristics are determined by those of the vibrations to which it is subjected, means for connecting said device to said mounting structure, direct current metering means in electrical circuit with said generator, a circuit interrupter in series with said metering means and said generator, and means for controlling the duration of the circuit-interrupting period of said interrupter, said last-named means being essentially mechanically independent of said rotating body and including a photoelectric device adapted to be actuated during a constant fraction of each revolution of the body, and means for varying the limits of the period of such actuation at will.

7. In apparatus for analyzing the unbalance of an elongated rotatable body into components respectively associated with a plurality of axially spaced radial planes in the body, a mounting structure rotatably supporting the body, a member extending along substantially the entire length of the body and so associated with said mounting structure as to vibrate in accordance with the vibrations of the body, a device for generating an observable quantity having characteristics determined by the vibrations to which the device is subjected, means for selectively connecting such device with the member at various points thereof along a substantial portion of its entire length, such portion being at least inclusive of the null points of the vibrations respectively produced by unbalance forces associated with each of said radial planes in the rotatable body, and means associated with said device for analyzing the characteristics of said observable quantity in terms of the amount and location of the unbalance forces producing such vibrations.

8. In apparatus for analyzing the unbalance of an elongated rotatable body into components respectively associated with a plurality of axially spaced radial planes in the body, a mounting structure rotatably supporting the body, a member extending along substantially the entire length of the body and so associated with said mounting structure as to vibrate in accordance with the vibrations of the body, a device for generating an electrical current having characteristics which are determined by the vibrations to which the device is subjected, means for selectively connecting such device with the member along a substantial portion of the entire length thereof, such portion being at least inclusive of the null points of the vibrations respectively produced by unbalance forces associated with each of said radial planes in the rotatable body, and means in circuit with said device for analyzing the characteristics of the current generated thereby in terms of the amount and location of the unbalance forces producing the vibrations to which the device is subjected.

9. In apparatus for analyzing the unbalance of an elongated rotatable body into components respectively associated with two axially spaced radial planes in the body, a mounting structure rotatably supporting the body, a member extending along substantially the entire length of the body and so associated with said mounting structure as to vibrate in accordance with the vibrations of the body, said member being of sufficient axial extent to include the two null points of the vibrations which are respectively produced by unbalance forces associated with each of said radial planes in the rotatable body, a pair of vibration responsive devices each adapted to develop an electrical current having characteristics which are determined by the characteristics of the vibrations to which the device is subjected, means connecting each of devices to a different one of said null points, and means associated with each of said devices for analyzing the characteristics of the current generated thereby in terms of the amount and location of the unbalance force producing the vibrations to which the device is subjected.

10. Apparatus for analyzing the unbalance of an elongated rotatable body comprising a mounting structure including means for rotatably supporting the body, a vibration responsive device for generating an observable quantity having characteristics which are determined by those of the vibrations to which the device is subjected, means for connecting said device to a point of said mounting structure which is a null point with respect to vibrations produced by unbalance forces associated with one end of said body but is subject to vibrations having characteristics determined by the amount and location of unbalance forces associated with the other end of said body, and means for analyzing the characteristics of said observable quantity, thereby to ascertain the amount and location of the unbalance forces associated with said other end of said body.

ERNEST L. THEARLE.

DISCLAIMER 2,131,602.—*Ernest L. Thearle*, Schenectady, N. Y. DYNAMICALLY BALANCING ROTATABLE BODY. Patent dated September 27, 1938. Disclaimer filed November 7, 1941, by the assignee, *General Electric Company*.

Hereby enters this disclaimer to claims 7 and 10 of said patent.

[*Official Gazette December 9, 1941.*]

terms of the amount and location of the unbalance forces producing such vibrations.

8. In apparatus for analyzing the unbalance of an elongated rotatable body into components respectively associated with a plurality of axially spaced radial planes in the body, a mounting structure rotatably supporting the body, a member extending along substantially the entire length of the body and so associated with said mounting structure as to vibrate in accordance with the vibrations of the body, a device for generating an electrical current having characteristics which are determined by the vibrations to which the device is subjected, means for selectively connecting such device with the member along a substantial portion of the entire length thereof, such portion being at least inclusive of the null points of the vibrations respectively produced by unbalance forces associated with each of said radial planes in the rotatable body, and means in circuit with said device for analyzing the characteristics of the current generated thereby in terms of the amount and location of the unbalance forces producing the vibrations to which the device is subjected.

9. In apparatus for analyzing the unbalance of an elongated rotatable body into components respectively associated with two axially spaced radial planes in the body, a mounting structure rotatably supporting the body, a member extending along substantially the entire length of the body and so associated with said mounting structure as to vibrate in accordance with the vibrations of the body, said member being of sufficient axial extent to include the two null points of the vibrations which are respectively produced by unbalance forces associated with each of said radial planes in the rotatable body, a pair of vibration responsive devices each adapted to develop an electrical current having characteristics which are determined by the characteristics of the vibrations to which the device is subjected, means connecting each of devices to a different one of said null points, and means associated with each of said devices for analyzing the characteristics of the current generated thereby in terms of the amount and location of the unbalance force producing the vibrations to which the device is subjected.

10. Apparatus for analyzing the unbalance of an elongated rotatable body comprising a mounting structure including means for rotatably supporting the body, a vibration responsive device for generating an observable quantity having characteristics which are determined by those of the vibrations to which the device is subjected, means for connecting said device to a point of said mounting structure which is a null point with respect to vibrations produced by unbalance forces associated with one end of said body but is subject to vibrations having characteristics determined by the amount and location of unbalance forces associated with the other end of said body, and means for analyzing the characteristics of said observable quantity, thereby to ascertain the amount and location of the unbalance forces associated with said other end of said body.

ERNEST L. THEARLE.

DISCLAIMER 2,131,602.—*Ernest L. Thearle*, Schenectady, N. Y. DYNAMICALLY BALANCING ROTATABLE BODY. Patent dated September 27, 1938. Disclaimer filed November 7, 1941, by the assignee, *General Electric Company*.

Hereby enters this disclaimer to claims 7 and 10 of said patent.

[*Official Gazette December 9, 1941.*]